(12) United States Patent
Bell

(10) Patent No.: US 9,143,076 B2
(45) Date of Patent: Sep. 22, 2015

(54) ELECTRIC POWER CONTROL SYSTEM AND EFFICIENCY OPTIMIZATION PROCESS FOR POLYPHASE SYNCHRONOUS MACHINE

(71) Applicant: UTILIDATA, INC., Providence, RI (US)

(72) Inventor: David Gordon Bell, Spokane, WA (US)

(73) Assignee: UTILIDATA, INC., Providence, RI (US)

(*) Notice: Subject to any disclaimer, the term of this patent is extended or adjusted under 35 U.S.C. 154(b) by 77 days.

(21) Appl. No.: 14/139,602

(22) Filed: Dec. 23, 2013

(65) Prior Publication Data

US 2014/0184134 A1    Jul. 3, 2014

Related U.S. Application Data

(63) Continuation of application No. 13/784,069, filed on Mar. 4, 2013, now Pat. No. 8,618,757, which is a continuation of application No. 12/540,366, filed on Aug. 13, 2009, now Pat. No. 8,390,227, which is a continuation-in-part of application No. 11/397,091, filed on Apr. 4, 2006, now Pat. No. 7,729,810.

(51) Int. Cl.

| H02P 27/00 | (2006.01) |
|---|---|
| H02P 25/02 | (2006.01) |
| H02J 3/00 | (2006.01) |
| H02P 23/00 | (2006.01) |

(52) U.S. Cl.
CPC .................. *H02P 25/021* (2013.01); *H02J 3/00* (2013.01); *H02P 23/0036* (2013.01); *H02P 2205/03* (2013.01); *H02P 2207/05* (2013.01)

(58) Field of Classification Search
USPC ............ 318/400.01, 400.02, 400.14, 400.15, 318/700, 701, 713, 727, 799, 430, 432; 323/205; 322/43; 324/141; 388/800, 388/821

See application file for complete search history.

(56) References Cited

U.S. PATENT DOCUMENTS

| 3,872,286 A | 3/1975 | Putman |
|---|---|---|
| 4,028,599 A | 6/1977 | Zankl et al. |
| 4,313,081 A | 1/1982 | Smith |
| 4,413,189 A | 11/1983 | Bottom, Jr. |
| 4,449,054 A | 5/1984 | Jop |
| 4,630,220 A | 12/1986 | Peckinpaugh |

(Continued)

OTHER PUBLICATIONS

Office Action U.S. Appl. No. 11/397,091 dated May 19, 2008.

(Continued)

*Primary Examiner* — Antony M Paul
(74) *Attorney, Agent, or Firm* — Foley & Lardner LLP; Christopher J. McKenna; Chethan K. Srinivasa

(57) ABSTRACT

A system and process includes continuously determining an applied armature voltage supplied to a polyphase synchronous machine for which a maximum mechanical load is characterized by a pull-out torque. The armature voltage is supplied from a power source via one of many taps of a regulating transformer. The armature voltage being supplied from the power source to the machine is changed by selecting one of the voltage levels from the taps of the regulating transformer. The tap voltage levels are selected based on the determined applied armature voltage to minimize power consumption of the machine while ensuring based on a predetermined confidence level that the pullout torque of the machine will not be exceeded.

20 Claims, 9 Drawing Sheets

(56) References Cited

U.S. PATENT DOCUMENTS

| | | |
|---|---|---|
| 4,684,875 A | 8/1987 | Powell |
| 4,695,737 A | 9/1987 | Rabon et al. |
| 4,974,140 A | 11/1990 | Iba et al. |
| 4,994,684 A * | 2/1991 | Lauw et al. .................. 290/52 |
| 5,028,804 A * | 7/1991 | Lauw .......................... 290/40 C |
| 5,117,175 A | 5/1992 | Pettigrew et al. |
| 5,300,870 A | 4/1994 | Smith |
| 5,319,304 A | 6/1994 | Whipple, III |
| 5,422,561 A | 6/1995 | Williams et al. |
| 5,466,973 A | 11/1995 | Griffioen |
| 5,594,333 A | 1/1997 | Whipple, III |
| 5,796,628 A | 8/1998 | Chiang et al. |
| 5,963,457 A | 10/1999 | Kanoi et al. |
| 6,104,179 A | 8/2000 | Yukawa |
| 6,313,600 B1 | 11/2001 | Hammond et al. |
| 6,356,745 B1 | 3/2002 | Lee et al. |
| 6,484,133 B1 | 11/2002 | Vogt |
| 6,625,520 B1 | 9/2003 | Chen et al. |
| 6,633,823 B2 | 10/2003 | Bartone et al. |
| 6,741,919 B1 | 5/2004 | Schuster et al. |
| 6,772,052 B1 | 8/2004 | Amundsen et al. |
| 7,069,117 B2 | 6/2006 | Wilson et al. |
| 7,729,810 B2 | 6/2010 | Bell et al. |
| 8,390,227 B2 | 3/2013 | Bell |
| 8,437,883 B2 | 5/2013 | Powell et al. |
| 8,577,510 B2 | 11/2013 | Powell et al. |
| 2001/0034569 A1 | 10/2001 | Yamamoto et al. |
| 2004/0253489 A1 | 12/2004 | Horgan et al. |
| 2005/0125104 A1 | 6/2005 | Wilson et al. |
| 2006/0229768 A1 | 10/2006 | Chassin et al. |
| 2014/0265574 A1 | 9/2014 | Tyler et al. |
| 2014/0277796 A1 | 9/2014 | Peskin et al. |
| 2014/0277813 A1 | 9/2014 | Powell et al. |
| 2014/0277814 A1 | 9/2014 | Hall et al. |
| 2014/0312693 A2 | 10/2014 | Powell et al. |

OTHER PUBLICATIONS

Office Action U.S. Appl. No. 11/397,091 dated Nov. 13, 2007.
Office Action U.S. Appl. No. 11/397,091 dated Jun. 25, 2009.
Office Action U.S. Appl. No. 11/397,091 dated Dec. 15, 2008.
Office Action U.S. Appl. No. 12/540,366 dated Sep. 24, 2012.
US Notice of Allowance on U.S. Appl. No. 12/540,366 DTD Dec. 13, 2012.
US Notice of Allowance on U.S. Appl. No. 11/397,091 dated Feb. 8, 2010.
US Notice of Allowance on U.S. Appl. No. 12/540,364 DTD Oct. 30, 2013.
US Notice of Allowance on U.S. Appl. No. 13/784,069 DTD Nov. 18, 2013.
US Office Action on U.S. Appl. No. 12/540,364 DTD Sep. 12, 2013.
US Office Action on U.S. Appl. No. 13/784,069 DTD Jun. 14, 2013.
Kennedy, P.E., et al., "Conservation Voltage Reduction (CVR) at Snohomish County PUD", IEEE Transactions on Power Systems, vol. 6, No. 3, Aug. 1991.
Reexam Non-Final Office Action for U.S. Appl. No. 90/009,512 dated Feb. 23, 2010.
Reexam Notice of Intent to Issue a Reexam Certificate for U.S. Appl. No. 90/009,512 dated Oct. 8, 2010.
US Notice of Allowance on U.S. Appl. No. 12/540,364 DTD Jan. 30, 2014.

* cited by examiner

ELECTRIC POWER CONTROL SYSTEM AND EFFICIENCY OPTIMIZATION PROCESS FOR POLYPHASE SYNCHRONOUS MACHINE

CROSS-REFERENCE TO RELATED APPLICATIONS

The present application is related to, claims the earliest available effective filing date(s) from (e.g., claims earliest available priority dates for other than provisional patent applications; claims benefits under 35 USC §119(e) for provisional patent applications), and incorporates by reference in its entirety all subject matter of the following listed application(s); the present application also claims the earliest available effective filing date(s) from, and also incorporates by reference in its entirety all subject matter of any and all parent, grandparent, great-grandparent, etc. applications of the following listed application(s):

1. United States patent application entitled ELECTRIC POWER CONTROL SYSTEM AND PROCESS, naming David G. Bell as inventors, filed substantially contemporaneously herewith.

2. U.S. patent application Ser. No. 11/397,091, entitled ELECTRICAL POWER DISTRIBUTION CONTROL SYSTEMS AND PROCESSES, naming David G. Bell; Thomas L Wilson; and Kenneth M. Hemmelman as inventors, filed Apr. 4, 2006.

3. U.S. patent application Ser. No. 12/540,366, entitled ELECTRIC POWER CONTROL SYSTEM AND EFFICIENCY OPTIMIZATION PROCESS FOR A POLYPHASE SYNCHRONOUS MACHINE, naming David Gordon Bell as inventor, filed Aug. 13, 2009.

4. U.S. patent application Ser. No. 13/784,069, entitled ELECTRIC POWER CONTROL SYSTEM AND EFFICIENCY OPTIMIZATION PROCESS FOR A POLYPHASE SYNCHRONOUS MACHINE, naming David Gordon Bell as inventor, filed Mar. 4, 2013.

TECHNICAL FIELD

These claimed embodiments relate to a method for regulating electric power being supplied to adjusting voltage levels of electric power provided to a polyphase synchronous machine based on estimates determined from the machine's loads power consumption.

BACKGROUND OF THE INVENTION

A method and apparatus for regulating electric power being supplied to a polyphase synchronous machine under load is disclosed.

When supplying power to a polyphase synchronous machine that consumes a tremendous amount of electrical power, several needs compete and must be simultaneously considered in managing its electrical power distribution. A first concern has to do with maintaining delivered electrical power voltage levels within predetermined limits. A second concern relates improving overall efficiency of electrical power usage and distribution. A third concern relates to these and other concerns in light of changing electrical loading of the machine and variations in the character of the loading so that the voltages do not decrease to such a level that the synchronous machine enters a state known as pull-out, in which the stator and rotor magnetic fields fail to maintain mutual engagement, characterized by the rotor field slipping out of engagement with the rotating magnetic field of the stator. This condition, commonly known as either pull-out or pole slip, can result in damage to the machine. The mechanical load condition at which pull-out or pole slip occurs is known as the pull-out torque.

One technique to accommodate changes in electrical loading is to set preset threshold levels at high enough levels at which pull-out is not likely to occur. Although this technique provides a margin of safety for the machine, it results in inefficiencies as the voltage of the system must be kept sufficiently high at all times even when the machine is not under a high load. Thus for an energy efficiency standpoint, a lot of energy is wasted providing unnecessarily high margins of safety.

SUMMARY OF THE INVENTION

A process is described in which an applied armature voltage supplied to a polyphase synchronous machine is continuously determined. The armature voltage is supplied from a power source via one of a plurality of taps of a polyphase regulating transformer. For the purpose of clarity, all references to regulators or regulating transformers shall be inclusive of polyphase regulators. Each of the tap settings supplies a voltage at a different level. The armature voltage being supplied from the power source to the machine is changed by selecting one of the voltage levels from the taps of the regulating transformer. The selection of one of the voltage levels is based on the determined applied armature voltage to minimize power consumption of the machine while ensuring, based on a predetermined confidence level, that the resulting pull-out torque of the machine will not be exceeded by the mechanical load.

In another implementation, a system is disclosed including a regulating transformer having taps that provide different output voltage levels respectively when connected to a power source. Each tap when selected can apply an armature voltage to a polyphase synchronous machine. The system includes a controller that continuously determines an actual applied armature voltage supplied to the polyphase synchronous machine and that provide a signal to change the applied armature voltage supplied to the polyphase synchronous machine by selecting one of the taps to minimize power consumption of the machine while ensuring within a predetermined confidence level that a pull-out torque of the machine is not exceeded.

In addition, a computer readable storage medium comprising instructions is disclosed. The instructions when executed by a processor is coupled with a regulating transformer having taps that provide different output voltage levels respectively when connected to a power source. Each tap when selected applies an armature voltage to a polyphase synchronous machine. The instructions when executed include continuously determining an actual applied armature voltage supplied to the polyphase synchronous machine, and providing a signal to change the applied armature voltage supplied to the polyphase synchronous machine by selecting one of the taps to minimize power consumption of the machine while ensuring within a predetermined confidence level that a pull-out torque of the machine is not exceeded.

BRIEF DESCRIPTION OF THE DRAWINGS

The detailed description is described with reference to the accompanying figures. In the figures, the left-most digit(s) of a reference number identifies the figure in which the reference number first appears. The use of the same reference number in different figures indicates similar or identical items.

DETAILED DESCRIPTION

Figure 1:
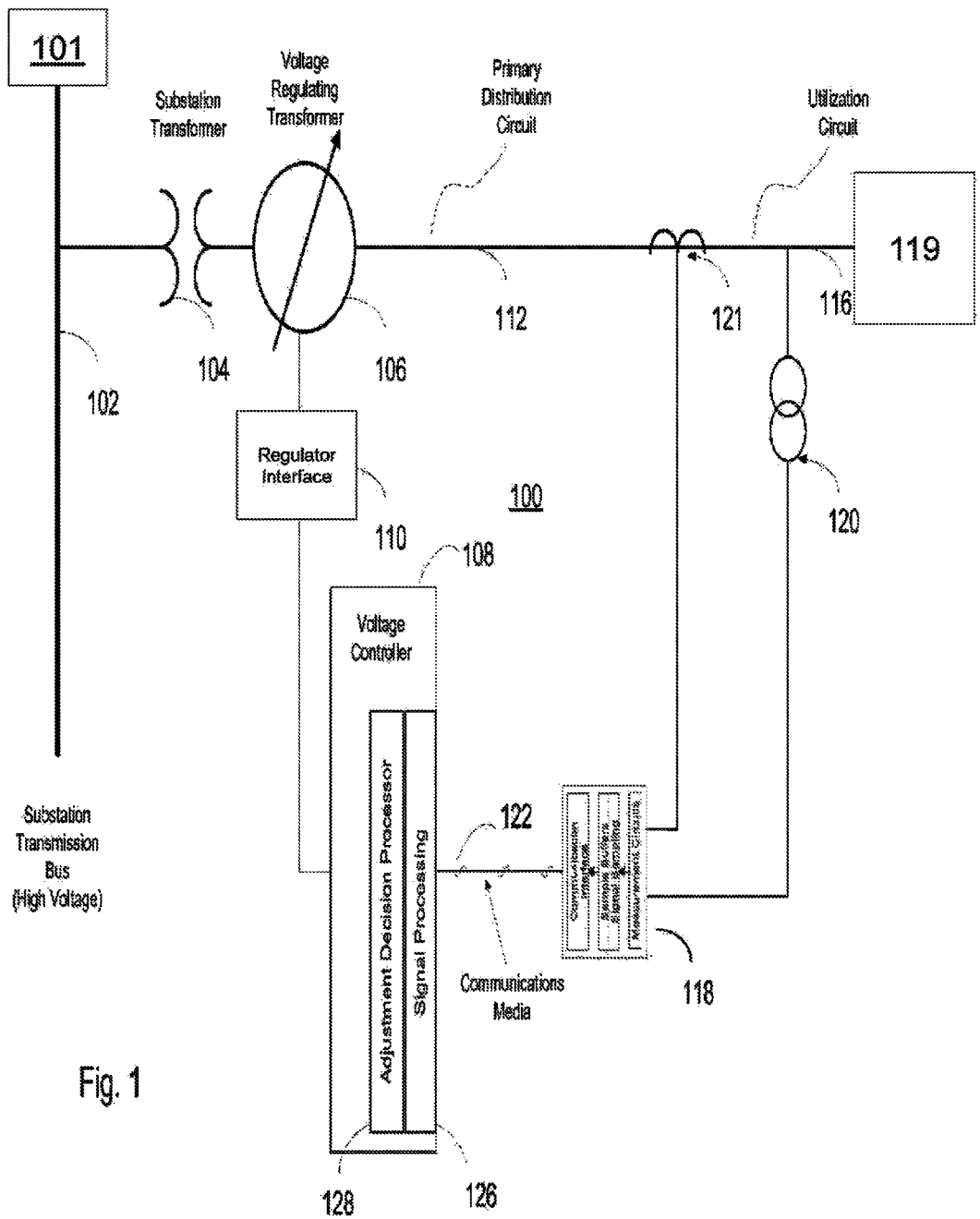
FIG. 1 is a simplified schematic diagram of an electric power control system for regulating power.

Referring to FIG. 1 there is shown a electric power control system 100 having power source 101 connected via a subsystem transmission bus 102 and via substation transformer 104 to a voltage regulating transformer 106. Voltage regulating transformer 106 is controlled by voltage controller 108 with regulator interface 110. Voltage regulating transformer 106 is coupled on primary distribution element or circuit 112 via distribution transformer 121 to utilization circuits 116 and to a polyphase synchronous machine 119. Voltage regulating transformer 106 has multiple tap outputs (not shown) with each tap output supplying electricity with a different voltage level. In an AC Power distribution system and as used herein voltage may be generally is referred to as an "RMS Voltage".

Monitoring device 118 is coupled through potential transformer 120 to secondary utilization circuit 116. Monitoring device 118 includes a measurement circuit, signal sampling and signal buffering circuits, and a communications interface circuit. Monitoring device 118 continuously detects measurements and continuous voltage signals of electricity supplied to a polyphase synchronous machine 119 connected to circuit 112 or 116 from a power source 101 coupled to bus 102. Monitoring device 118 is coupled via communications media 122 to voltage controller 108.

Voltage controller 108 determines an actual applied armature voltage supplied to the polyphase synchronous machine. Controller 108 provides a signal to voltage regulating transformer 106 via regulator interface 110 to change the applied armature voltage supplied to the polyphase synchronous machine by selecting one of the plurality of taps in transformer 106 to minimize power consumption of the machine while ensuring within a predetermined confidence level that a pull-out torque of the machine is not exceeded. Voltage controller 108 includes a voltage signal processing circuit 126 that receives sampled signals from metering device 118. Metering device 118 processes and samples the continuous voltage signals such that the sampled voltage signals are outputted as a uniformly sampled time series that are free of spectral aliases. Such a metering device having this process and sample capability is generally commercially available.

Voltage signal processing circuit 126 receives voltage, current, real power, and reactive power signals via communications media from metering devices 118 processes the signals and feeds them to voltage adjustment decision processor element or circuit 128. Voltage signal processing circuit 126 and Adjustment decision processor circuit 128 determines characteristics of the synchronous machine that are predicted to be affected by future changes in the voltage levels provided from the voltage regulating transformer 106. Examples of these characteristics include a slip of the synchronous machine, an estimated torque demand, a margin of pull-out torque, and a forecast maximum mechanical torque demand.

Details of these determinations are explained in more detail herein. In response to these determinations, the voltage controller 108 provides a signal to via regulator interface 110 to set the tap position. As the computed estimated torque demand, margin of pull-out torque, forecast maximum mechanical torque demand, vary in time due to changing machine load, the voltage level of the electricity supplied to the synchronous machine 119 is changed.

Figure 2A:
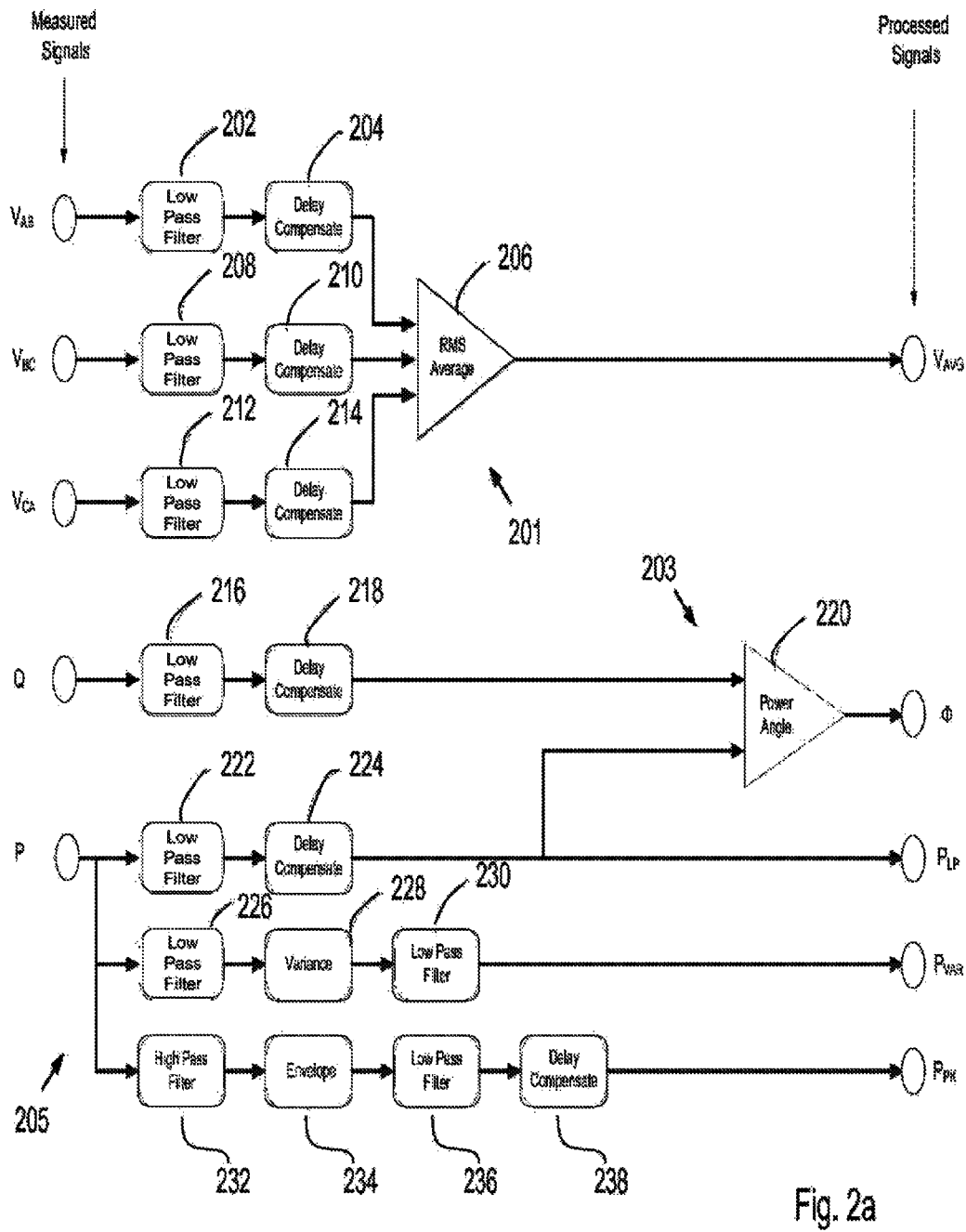
FIGS. 2a-2c are simplified schematic diagrams of voltage signal processing elements that processes measured voltage signals to provide selected voltage signals for tap regulation.
Figure 2B:
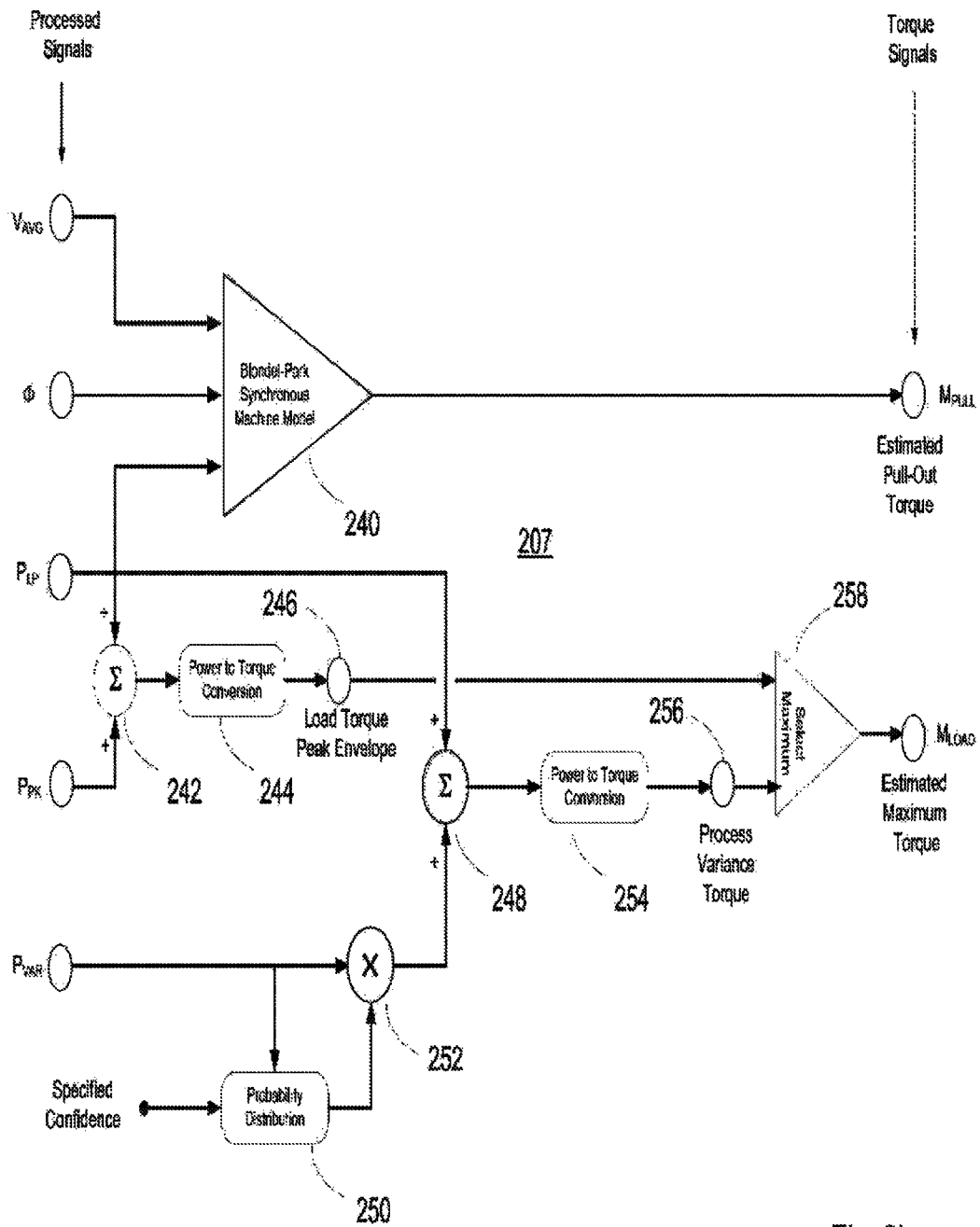

Referring to FIGS. 2a and 2b, in which an exemplary three phase power system and synchronous machine is depicted in voltage signal processing element 200 (signal processing block 126 in FIG. 1). Element 200 is shown including RMS averaging elements 201, Power angle detection elements 203, Power variance elements 205, and torque estimating elements 207. Referring to FIG. 2a, RMS averaging elements 201 receives voltage levels $V_{AB}$, $V_{BC}$, and $V_{CA}$ from metering device 118, wherein the subscript letters indicate the utilization circuit phases across which the voltages are measured and determines an Average Voltage signal ($V_{AVG}$). Power angle detection elements 203 receives a signal indicating the Armature reactive power (Q) and a signal indicating the Armature real power (P) from metering device 118 and generates a power angle ($\phi$). Power variance elements 205 receives a signal indicating the Armature real power (P) from metering device 118 and generates ($P_{LP}$) delay compensated linear phase low pass filtered Armature real demand, smoothed peak envelope Armature real demand, ($P_{PK}$), $P_{VAR}$ the variance of the Armature real demand.

RMS averaging elements 201 includes three parallel low pass filter/delay compensate elements (202/204, 208/210, and 212/214) connected to the input of RMS average integrator element 206. Delay Compensate element 204 (as well as 210 and 214) is fed the output of the low pass filter 202 (as well as 298 and 212) where the signal or an estimate of the signal from the respective filter is extrapolated in time such that the delay resulting from the low pass filtering operation is removed.

Power angle detection elements 203 include low pass filter 216 connected via delay compensate element 218 to one terminal of power angle comparator 220. Power angle detection elements 203 also includes low pass filter 216 connected via compensate circuit element 218 to another terminal of power angle calculator 220 (described in detail herein). Delay Compensate element 218 or 224 is fed the output of the low pass filter 216 or 222 respectively where the signal or an estimate of the signal from the respective filter is extrapolated in time such that the delay resulting from the low pass filtering operation is removed. The calculator 220 output is the power angle ($\phi$). The output of delay compensate 218 is the delay compensated linear phase low pass filtered Armature reactive demand signal ($Q_{LP}$). The output of delay compensate 224 is the delay compensated linear phase low pass filtered Armature real demand signal ($P_{LP}$).

The Power variance elements 205 includes high pass filter 226 coupled in series via variance element 228, to low pass filter 230. The output of the low pass filter 230 is the $P_{VAR}$ signal. Power variance elements 205 also includes high pass filter 232 coupled in series with envelope element 234 and low pass filter to delay compensate element 238. In envelope element 234, the signal is formed into a peak envelope with specified peak decay characteristics. Delay compensate element 238 is fed the output of the low pass filter 230 where the signal or an estimate of the signal from the respective filter is extrapolated in time such that the delay resulting from the low pass filtering operation is removed. The output of element 238 is the $P_{PK}$ signal.

Figure 2C:
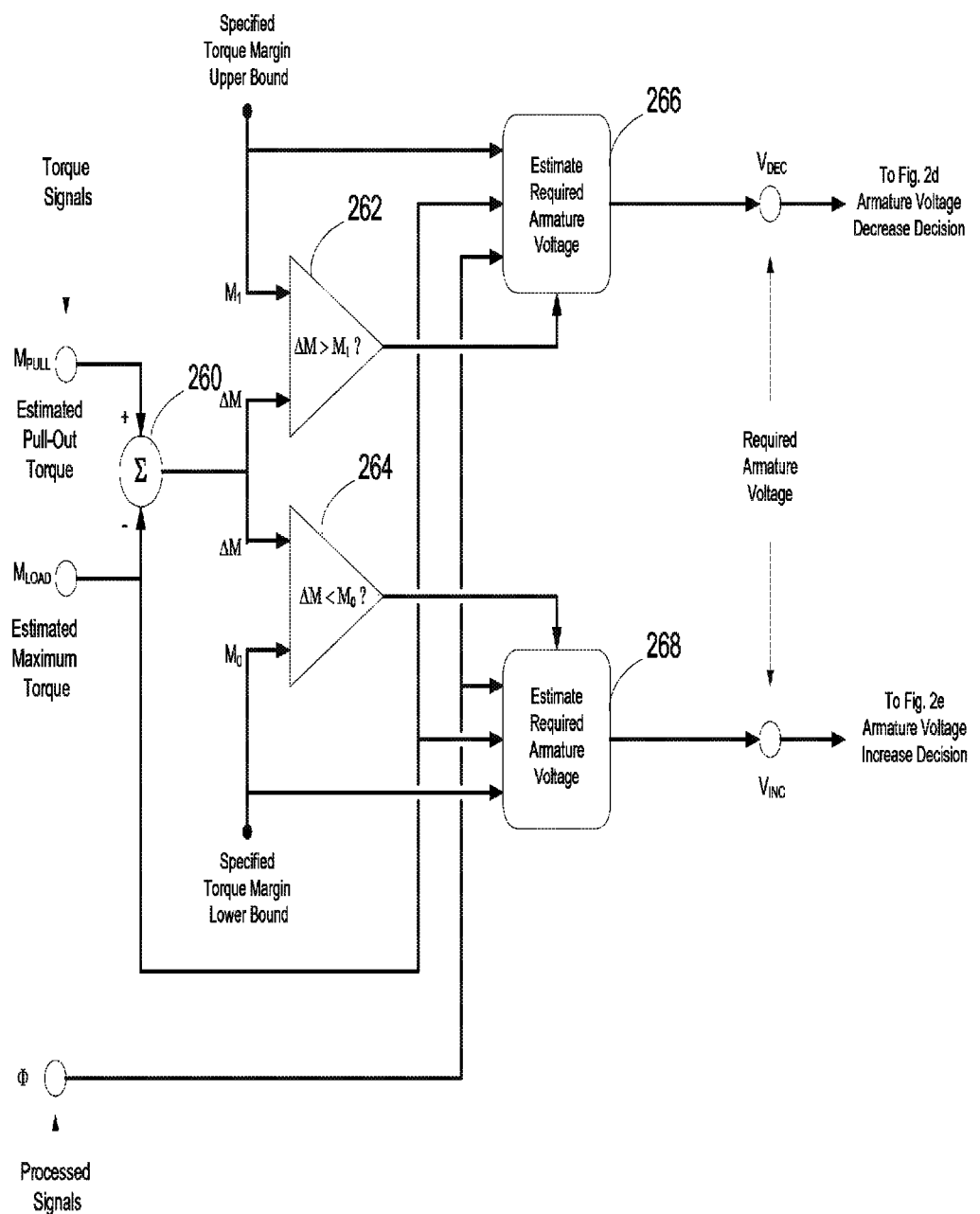

Referring to FIG. 2b, elements 207 includes the $V_{AVG}$, power angle (φ), signal $Q_{LP}$ and signal $P_{LP}$ (See FIG. 2a), and machine parameters (as defined herein) are applied to Blondel-Park synchronous machine model 240 to generate a pull-out torque indication signal (which is applied in FIG. 2c to element 260). The Blondel-Park model for synchronous machines as it is known today emerged principally from two references: "Synchronous Machines", a classic engineering book by A. E. Blondel, published in English in 1913, and "Two-Reaction Theory of Synchronous Machines", a technical paper by R. H. Park, published in 1929.

The Blondel-Park model is also sometimes referred to as the two-reaction model, or more frequently as the Direct-Quadrature model, since the two reactions discussed in these classic references refer to the components of machine rotor currents and EMFs resolved along orthogonal axes as the rotor magnetic field poles. The formulation discussed herein will use the Direct-Quadrature model (DQ) nomenclature. Detailed explanations and exemplary interpretations for the parameters defined and used in this formulations may be obtained from either of these classic references, or alternatively from a vast array of modern references on the subject of electric motors and generators; see for example: Fitzgerald, Kingsley, and Umans, "Electric Machinery", McGraw-Hill 2003, ISBN 0073660094.

Estimation of the Synchronous Machine Pull-Out Torque Using DQ Parameters.

The synchronous machine structural and behavioral parameters will be specified using the per-unit system, additional definitions (in addition to the definitions provided previously in the description) and abbreviations as follows:

Although an exemplary three-phase calculation is shown, the number of phases can be changed to any number by changing only one formula for $V_{ARM}$ The abbreviation 'pu' shall indicate a per-unit quantity.

Additional Definitions

These quantities are typically provided by the synchronous machine manufacturer:
$M_{BASE}$: Machine basis torque, as N-m or lb-ft
$M_{PULL}$: Machine pull-out torque, as N-m or lb-ft
$N_{BASE}$: Machine basis rotation speed, as RPM
$V_{BASE}$: Machine basis voltage, phase to neutral
$R_A$: Armature winding resistance, pu
$X_D$: Direct axis unsaturated reactance, pu
$X_Q$: Quadrature axis unsaturated reactance, pu
$I_S$: Armature saturation current magnitude, pu These quantities are measured during synchronous machine operation:
$Q_{LP}$: Low pass filtered reactive power demand, VAR
$P_{LP}$: Low pass filtered real power demand, Watts
$V_{AVG}$: Low pass filtered average phase to phase voltage measured at the machine terminals, Volts $$\Phi = \tan^{-1}\left(\frac{Q_{LP}}{P_{LP}}\right):$$

Power angle, also Known as power factor angle

These quantities are calculated for the estimation of the pull-out torque:
$V_{ARM} = V_{AVG}/(\sqrt{3}V_{BASE})$: Equivalent average armature voltage, pu
$I_D$: Direct axis current phasor, pu
$E_Q$: Quadrature axis voltage, pu
$E_F$: Direct axis effective voltage, pu
$\delta_0$: Rotor torque angle, radians, initial estimate
$\delta_1$: Rotor torque angle, radians, iterated estimate
$j=\sqrt{-1}$: Base imaginary number for complex notation
$S_1$: Apparent power component of torque angle, pu
$S_2$: Apparent power component of twice torque angle, pu
$f()$: Rotor torque angle iteration function These quantities are General mathematical nomenclature:
$j=\sqrt{-1}$: Base imaginary number for complex notation
$Im()$: Imaginary part of a complex number
$Re()$: Real part of a complex number
Euler notation is described for complex quantities in the calculation procedure outlined here.

Calculation Procedure

Part 1: Static Computations $$E_Q = I_S(\cos\Phi + j\sin\Phi)(R_A + jX_Q) + V_{ARM}$$

$$S_2 = V_{ARM}^2 \frac{(X_D - X_Q)}{2X_D X_Q}$$

$$\delta_1 = \tan^{-1}\left(\frac{Im(E_Q)}{Re(E_Q)}\right)$$

Part 2: Iterated Computations $$\delta_0 = f(\delta_1)$$

$$I_D = I_S \sin(\Phi + \delta_0)\left(\cos\left(\delta_0 - \frac{\pi}{2}\right) + j\sin\left(\delta_0 - \frac{\pi}{2}\right)\right)$$

$$E_F = E_Q + jI_D(X_D - X_Q)$$

$$S_1 = |E_F|\frac{V_{ARM}}{X_D}$$

$$\delta_1 = \cos^{-1}\left(\frac{\sqrt{S_1^2 + 32S_2^2} - S_1}{8S_2}\right)$$

Part 3: Final Computations $$M_{PULL} = M_{BASE}(S_1 \sin(\delta_1) + S_2 \cos(2\delta_1))$$

The iteration function may be used in stabilizing iterative procedures and in improving final result convergence. This function may be, for example, one of: (i) simple substitution of the new estimate into the iteration function output, (ii) weighted step, in which some part of the difference between the present and prior results is applied to the iteration function output, or (iii) a projection algorithm which extrapolates (projects) a new iteration function output depending on two or more prior outputs. The iteration function also terminates the Iteration Computations when the difference between the present and prior estimates is suitably small, indicating convergence.

The $P_{LP}$ and the $P_{PK}$ signal are summed with summation element 242 and applied to power to torque converter 244, which generates a converted torque signal. The converted torque signal is fed via load torque peak envelope element 246 to select maximum detector 258.

A pre-specified confidence level indication signal is provided to a probability distribution element 250. Element 250 then generates a constant corresponding to the confidence that is multiplied by the value for $P_{VAR}$ in multiplier Element 252. The output multiplied value is then fed to summation Element 248 where it is summed with the $P_{LP}$ signal. The summed signal is then fed to the power to torque converter Element 254 and subsequently processed by a process variance torque Element 256. The processed converted signal is then fed to the select maximum detector 258 where it is compared against the converted torque signal from the load torque peak envelop Element 246. The maximum signal of the two signals is then provided from the torque Element 256. The processed converted signal is then fed to the select as an estimated maximum torque signal ($M_{LOAD}$).

Figure 2D:
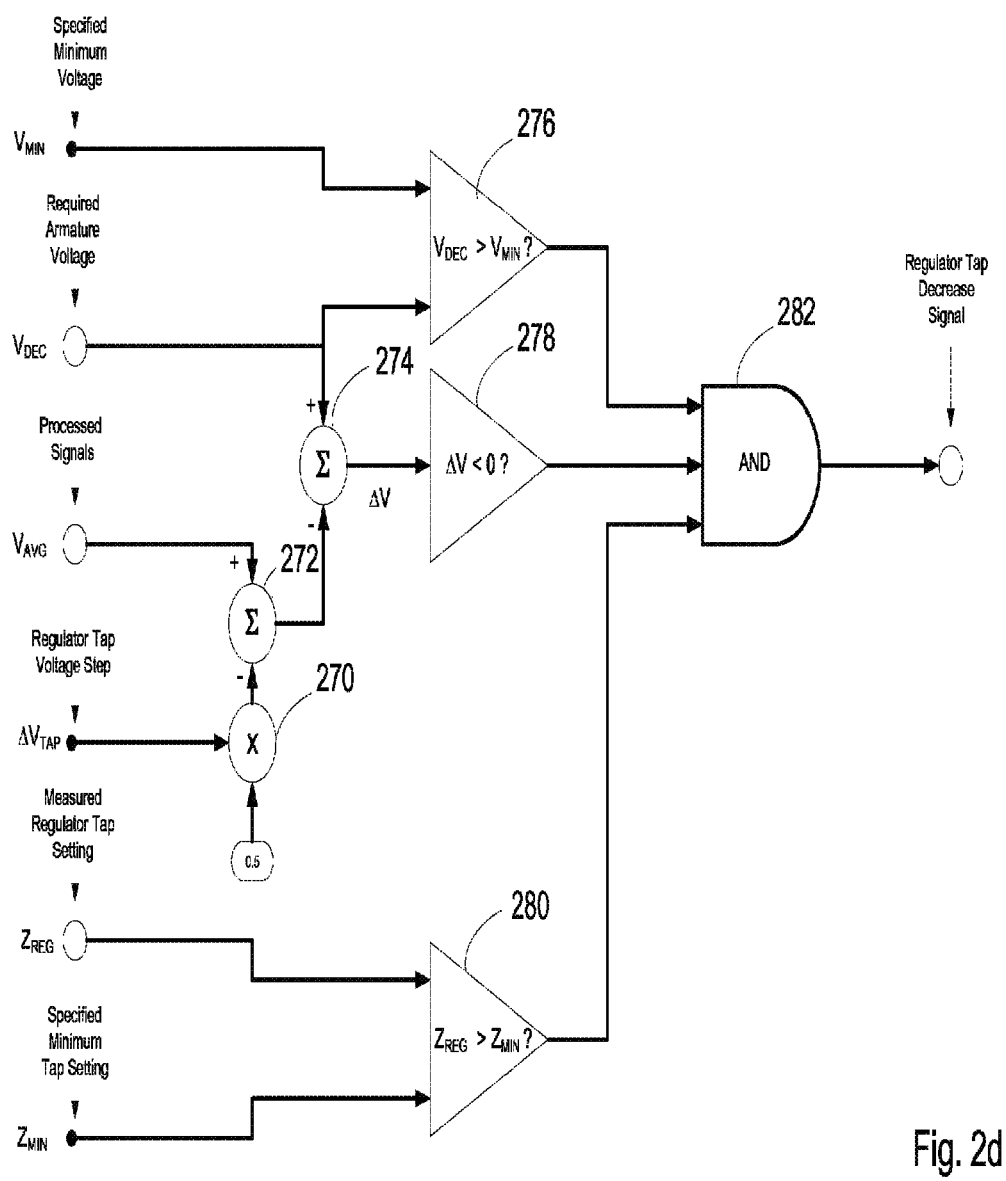
FIGS. 2d-2e describe the voltage adjustment decision processes implemented by voltage controller shown in FIG. 1.
Figure 2E:
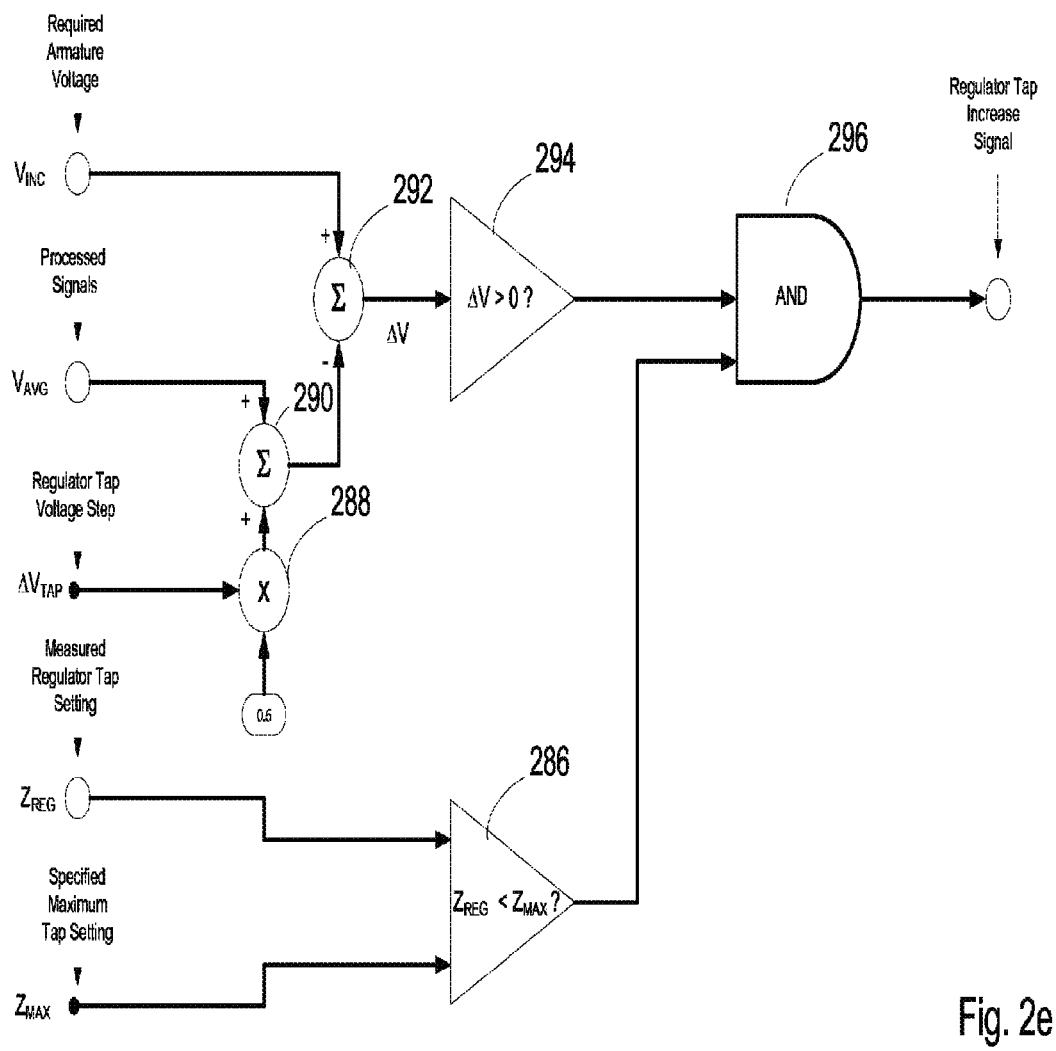

Adjustment decision processor includes circuits and elements described in FIGS. 2c-2e. Referring to FIG. 2c, the estimated maximum torque ($M_{LOAD}$) is then applied to the summation element 260 with the estimated pull out torque signal ($M_{PULL}$). Summation element 260 subtracts the $M_{LOAD}$ from $M_{PULL}$ and provides the difference between the signals (AM) to Comparators 262 and 264. The Specified Torque Margin Upper Bound is fed to Comparator 262 and is compared with signal (AM). The output of the comparator 262 is fed to element 266 along with the power angle ($\Phi$) signal, and the $M_{LOAD}$, to compute an estimate of the required armature voltage. The Specified Torque Margin Lower Bound is fed to Comparator 264 and is compared with ($\Delta M$). The output of the comparator 264 is fed to element 266 along with the power angle ($\Phi$) signal, and the $M_{LOAD}$, to compute an estimate of the required armature voltage. Element 266 and 268 computes an estimate of the required armature voltage using the formulas set forth below.

The calculation of synchronous machine torques in operation using the DQ model includes nonlinear dependence on the armature voltage, the machine real power demand, and the machine reactive power demand. The inverse calculation of the required armature voltage for a specified torque thus requires the inversion of nonlinear functions, which may not be practical in many real time control applications. However, some limited regimes of the associated nonlinearities may be suitably approximated by linear functions. Such linear functions may be estimated, for example, by means of linear regression on the nonlinear functions as illustrated using the following Computation for $V_{EST}$. The approximating linear function obtained by linear regression is completely defined by its regression coefficients, identified as the $\beta$ coefficients, discussed below.

Definitions:

Quantities associated with limited regime approximation of voltage $M_{LOAD}$: Specified load torque of interest, N-m $V_{EST}$: Estimated armature voltage for a specified load torque under given operating conditions, Volts $\beta_0$: Regression constant, Volts $\beta_{1\Phi}$: Regression factor for power angle, Volts/radian $\beta_M$: Regression factor for load torque, Volts/N-m Computation $V_{EST} = \beta_0 + \beta_\Phi \Phi + \beta_M M_{LOAD}$, where coefficients $\beta$ must be estimated for each synchronous machine of interest.

The estimated required armature voltage from element 266 is provided as a decrease indication signal $V_{DEC}$ to comparator 276 and summation element 274 (FIG. 2d), and the estimated required armature voltage from element 268 is provided as an increase indication signal $V_{DEC}$ to summation element 292 (FIG. 2e).

Referring to FIG. 2d, the specified minimum voltage indication signal $V_{MIN}$ is fed to one terminal of comparator 276 and the required armature voltage signal $V_{DEC}$ is fed to the other terminal of comparator 276 and summation element 274. Comparator 276 provides a positive indication signal to AND gate 282 only if signal $V_{DEC}$ is greater than signal $V_{MIN}$.

Regulator Tap Voltage Step signal $\Delta V_{TAP}$ is provided to multiplier element 270 where it is divided in half and fed to summation element 272. Processed signal $V_{AVG}$ is also applied to Summation element 272. Summation element 272 subtracts signal $\Delta V_{TAP}$ from signal $V_{AVG}$ and the difference is applied to summation element 274. Required Armature Voltage $V_{DEC}$ is also applied to Summation element 274. Summation element 274 subtracts the output signal of element 272 from $V_{DEC}$ and applies the difference as signal $\Delta V$ to threshold detector 278. The output of Threshold detector 278 triggers (providing a positive indication) if $\Delta V$ is less than 0 and is applied to AND gate 282.

Measured Regulator Tap setting signal $Z_{REG}$ and Specified Minimum Tap Setting signal $Z_{MIN}$ is applied to Comparator 280. When $Z_{REG}$ is greater than $Z_{MIN}$, comparator 280 is triggered providing a positive indication signal to AND gate 282. When a positive indication signal is provided on all inputs to AND gate 282, AND gate triggers resulting in a Regulator tap decrease signal being fed to voltage regulator transformer 106 via regulator interface 110.

Referring to FIG. 2e, the Measured Regulator Tap setting $Z_{REG}$ and the Specified Maximum tap setting $Z_{MAX}$ is applied to comparator 286. Comparator 286 provides a positive indication signal only if the $Z_{MAX}$ is less than $Z_{REG}$, and feeds the indication signal to AND gate 296.

Regulator Tap Voltage Step signal $\Delta V_{TAP}$ is provided to multiplier element 288 where it is divided in half and fed to summation element 290. Processed signal $V_{AVG}$ is also applied to Summation element 290. Summation element 290 subtracts divided signal $\Delta V_{TAP}$ from signal $V_{AVG}$, and the difference is applied to summation element 292. Signal $V_{INC}$ is also applied to summation element 292. Summation element 292 subtracts the output of element 290 from signal $V_{INC}$ and applies the difference as signal $\Delta V$ to threshold detector 294. The output of Threshold detector 294 triggers (providing a positive indication) if signal $\Delta V$ is less than 0 and is applied as a positive indication (logical TRUE state) to AND gate 296. When a positive indication is provided on all inputs to AND gate 296, AND gate 296 triggers resulting in a Regulator tap increase signal being fed to voltage regulator transformer 106 via regulator interface 110.

Example Voltage Controller Architecture

Figure 3:
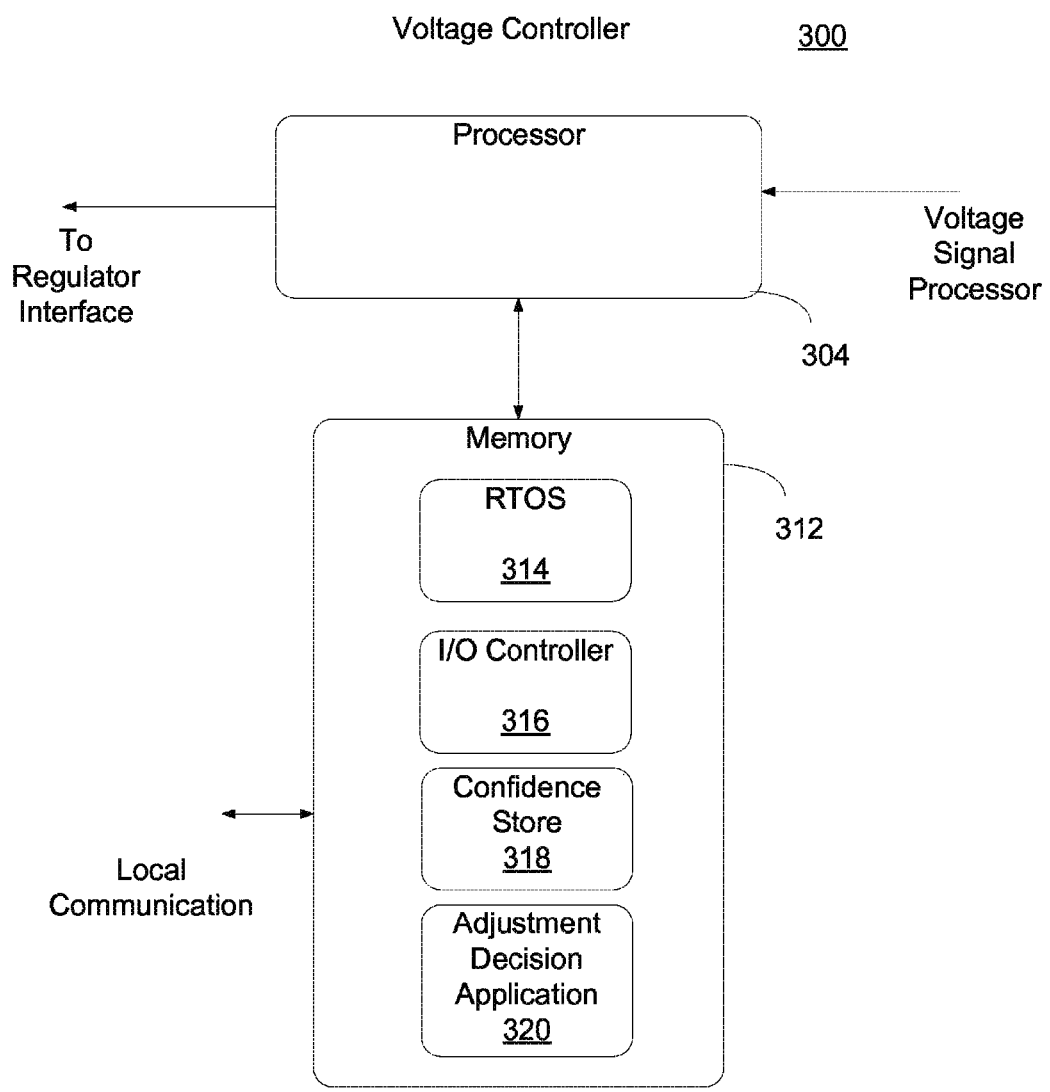
FIG. 3 is a simplified schematic diagram of a voltage controller shown in FIG. 1.
Figure 4:
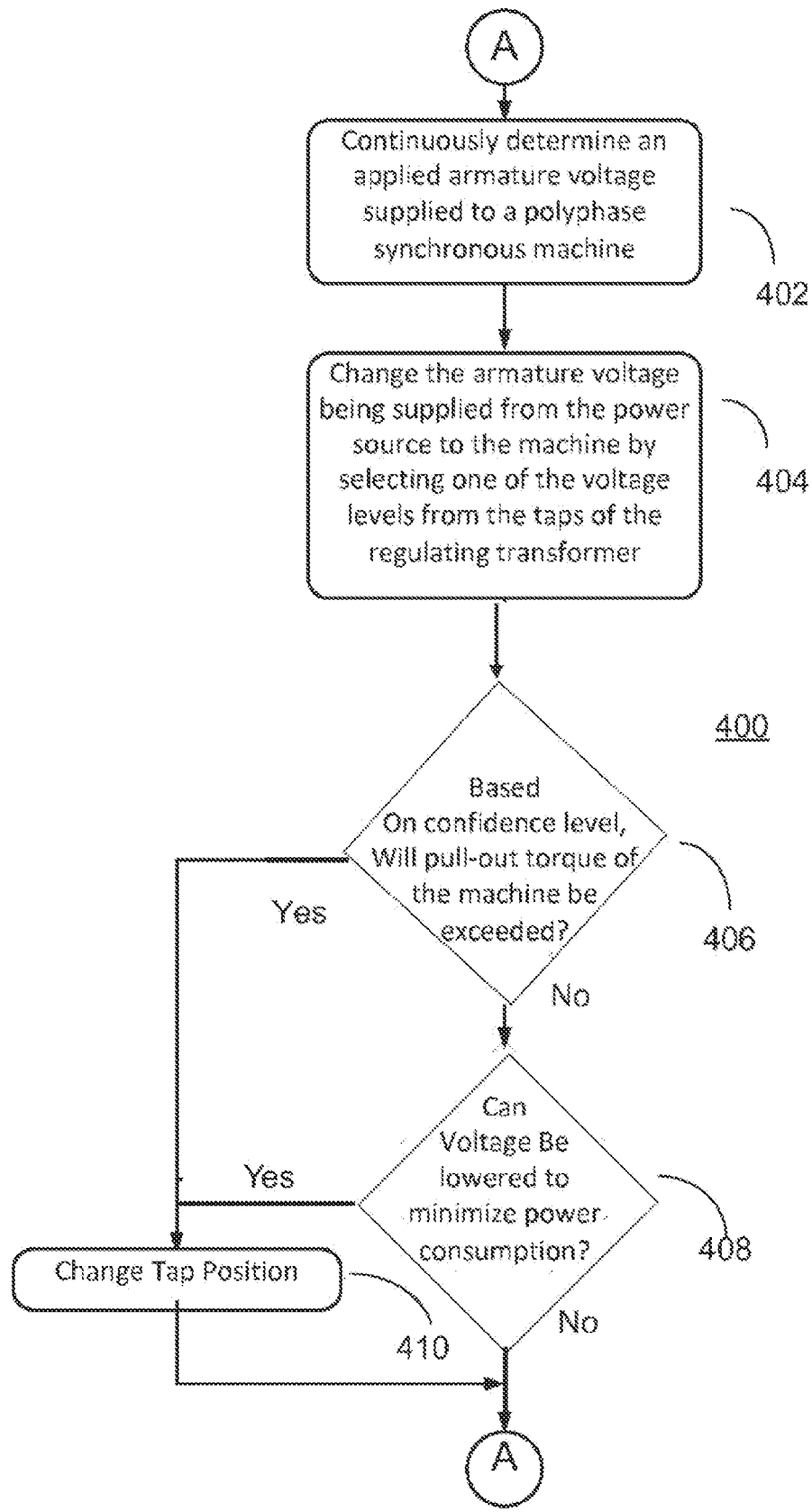
FIG. 4 is a flow chart determining a voltage adjustment decision by voltage controller shown in FIG. 3.

In FIG. 3 are illustrated selected modules in Voltage Controller 300 using an optional process 400 shown in FIG. 4. Voltage Controller receives Signals from voltage signal processing element 126 and feeds signals to regulator interface 110. Voltage Controller 300 has processing capabilities and memory suitable to store and execute computer-executable instructions. In one example, Voltage Controller 300 includes one or more processors 304 and memory 312.

The memory 322 may include volatile and nonvolatile memory, removable and non-removable media implemented in any method or technology for storage of information, such as computer-readable instructions, data structures, program modules or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computer system.

Stored in memory 322 of the Voltage Controller 300 may include a real time operating system 314, an I/O controller 316, a confidence store 318, and an adjustment decision application 320. Real time operating system 314 may be used by adjustment decision application 320 to operate controller 300. I/O controller may provide drivers for Voltage controller to communicate with Voltage signal processor or regulator interface. A confidence store 318 may include preconfigured parameters (or set by the user before or after initial operation) such a confidence values, electrical device operating parameters, voltage levels, machine operating parameters and probabilities. Such values may be update through an interface with the user directly to the voltage controller (not shown).

Although determining a voltage adjustment decision is described using elements described in FIGS. 2a-2e, alternatively a process for determining a voltage adjustment decision may also be implemented using an exemplary optional process 400. The exemplary process 400 may be a collection of blocks in a logical flow diagram, which represents a sequence of operations that can be implemented in hardware, software, and a combination thereof. In the context of software, the blocks may represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

Referring to FIG. 4, a process 400 is shown for determining a voltage adjustment decision by adjustment decision processor circuit 128 using the processor 300 and modules 314-320 shown in FIG. 3. In the process, the selected voltage signal is received from the voltage signal processing element 126 (FIG. 1) or alternatively directly from monitoring device 118 in block 402. In block 402, processor 300 determines an applied armature voltage supplied to the polyphase synchronous machine 119 (FIG. 1).

The processor 300, in block 404, changes the armature voltage being supplied from the power source to the machine 119 by selecting one of the voltage levels from the taps of the regulating transformer 106. A determination is made in block 406 based on a confidence level and estimates (determined as described previously) will the pull-out torque of the machine be exceeded.

If the pull-out torque of the machine cannot be exceeded, a determination is made in block 408 as to whether the voltage levels from the taps of the regulating transformer 106 can be lowered.

If the voltage levels can be lowered or if based on the confidence level the pull out torque of the machine will be exceeded, the an indication signal is sent via regulator interface 110 to voltage regulating transformer 106 to change the tap position (increase or decrease the tap position using the techniques previously described). After blocks 408 and 410 are executed, the process repeats in block 402 where processor 300 determines an applied armature voltage supplied to the polyphase synchronous machine 119.

Figure 5:
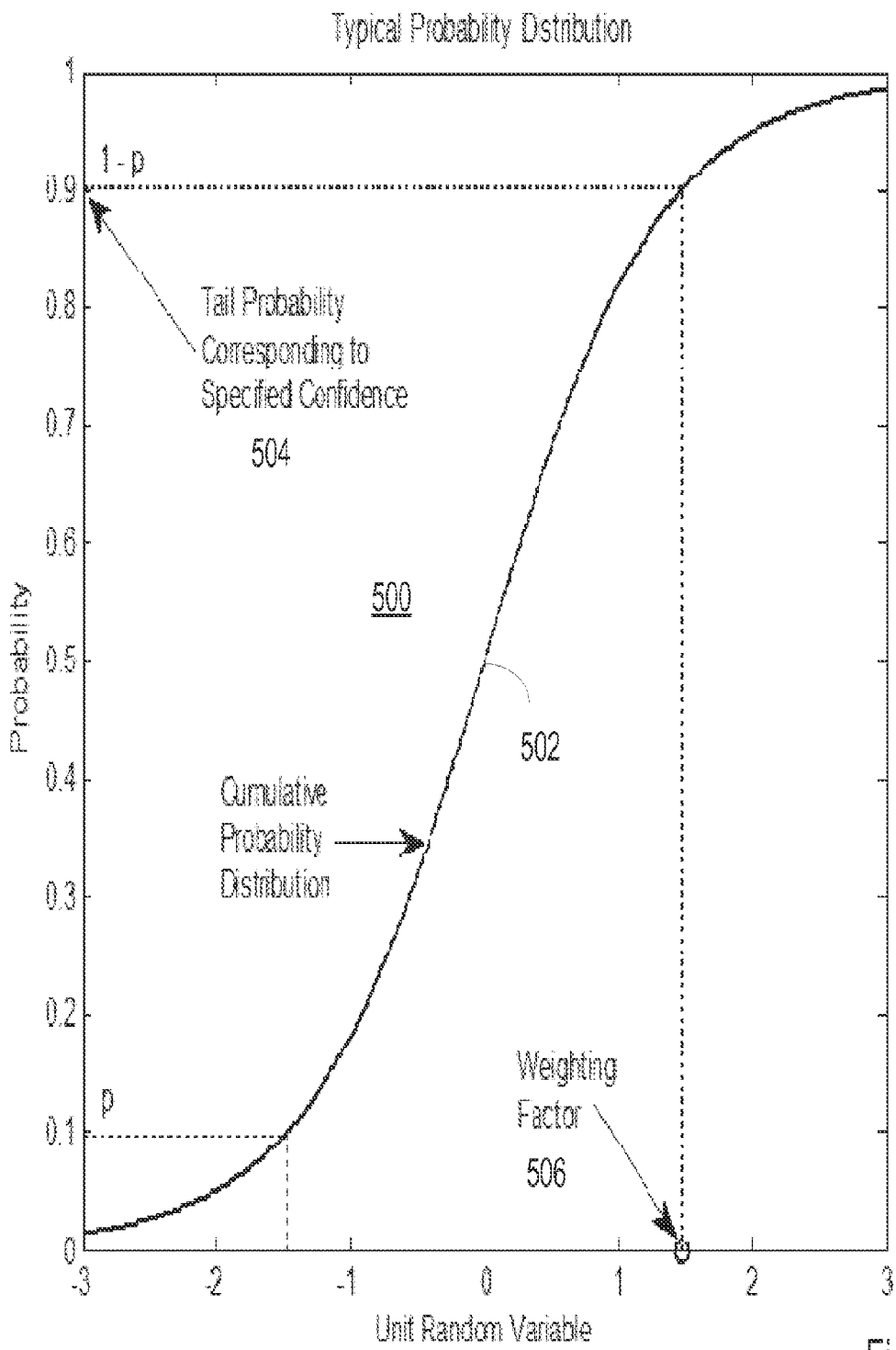
FIG. 5 is a diagram illustrating a typical probability distribution of the voltage control system that is used to select a weighting factor that is used in estimating consumed power deviations.

Referring to FIG. 5, diagram 500 is shown having cumulative probability distribution curve 502 illustrating a typical probability distribution of the voltage control system that is used to select a weighting factor that is used in estimating voltage deviations. The x-axis corresponds to a unit random variable and the y-axis corresponds to a probability. In one implementation a "Tail Probability" 504 or (1−p) is computed using the formula "p=(1−a)/2", where "a" is the specified confidence level and "p" is the tail probability. A "Weighting Factor" 506 is the value of the unit random variable (also generally referred to as "normalized") as located on the Probability Distribution corresponding to the Tail Probability. Although a typical probability distribution is shown, the particular probability distribution that is applied may vary depending on the properties of the electrical load for the electrical or electronic devices.

From the foregoing, it is apparent the description provides systems, processes and apparatus which can be utilized to monitor and manage electrical power distribution. Further, the disclosed systems, processes and apparatus permit power conservation by maintaining delivered voltages near levels that optimize the efficiency of the connected electrical and electronic devices and also can provide more robust power delivery under inclement power system loading conditions. In addition, the systems, processes and apparatus of the present system are cost effective when compared with other power management devices. In contrast to prior art systems, the present systems, processes and apparatus provide infinite variability of system parameters, such as multiple, different delivered voltage levels, within predetermined limits. For example, all users can be incrementally adjusted up or down together, or some users may be adjusted to a first degree while other users are adjusted to another degree or to separate, differing degrees. Such advantageously provides new flexibility in power distribution control, in addition to providing new methods of adjustment.

While the above detailed description has shown, described and identified several novel features of the invention as applied to a preferred embodiment, it will be understood that various omissions, substitutions and changes in the form and details of the described embodiments may be made by those skilled in the art without departing from the spirit of the invention. Accordingly, the scope of the invention should not be limited to the foregoing discussion, but should be defined by the appended claims.

What is claimed is:

1. A method comprising:
   determining an applied armature voltage supplied to a polyphase synchronous machine having a pull-out torque, the armature voltage supplied from a power source via one of a plurality of taps of a regulating transformer, a first tap of the plurality of taps configured to supply a voltage at a different level than a second tap of the plurality of taps;
   selecting the second tap to supply the armature voltage based on the determined applied armature voltage, power consumption of the machine, and a confidence level that the pull-out torque is not exceeded, wherein the confidence level corresponds to a probability distribution indicative of at least one operating characteristic of the polyphase synchronous machine; and
   responsive to a slip of the polyphase synchronous machine, increasing a margin of the pull-out torque.

2. The method of claim 1, further comprising:
   continuously determining the applied armature voltage supplied to the polyphase synchronous machine.

3. The method of claim 1, wherein the selected confidence level is applied to a statistic of the time varying mechanical load applied to the polyphase synchronous machine.

4. The method of claim 1, further comprising:
   determining a slip of the polyphase synchronous machine.

5. The method of claim 1, further comprising:
   determining a mechanical torque demand; and
   comparing the mechanical torque demand against a predetermined torque.

6. The method of claim 5, further comprising:
   determining an optimum armature voltage level corresponding to the predetermined torque.

7. The method of claim 5, wherein determining the mechanical torque demand is based on a measurement of the machine actual load.

8. The method of claim 7, further comprising:
determining the maximum mechanical torque demand in real time.

9. The method of claim 1, further comprising:
setting the armature voltage to be supplied to the machine to cause the pull-out torque of the machine to be greater than a maximum mechanical torque demand.

10. The method of claim 1, further comprising:
specifying a margin of the pull-out torque with an upper and a lower bound to decrease a frequency of armature voltage changes.

11. The method of claim 1, wherein the selecting the second tap comprises:
determining a suitably smooth estimate of the mechanical load torque using a real power demand signal observed at armature terminals of the polyphase synchronous machine;
determining a pull-out torque of the machine using physical parameters of the polyphase synchronous machine, a real and reactive power observed at the armature terminals, and the applied armature voltage; and
comparing a difference in the mechanical load torque and the pull-out torque against a pre-defined margin boundary.

12. A method comprising:
receiving, by a voltage signal processor, an indication of an armature voltage, real power and reactive power monitored at an armature of a synchronous machine;
determining a characteristic of the synchronous machine based on the received indication, the characteristic comprising a maximum mechanical torque demand; and
adjusting, based on the determined characteristic and a confidence level that a pull-out torque of the synchronous machine will not be exceeded, the armature voltage supplied to the synchronous machine.

13. The method of claim 12, wherein the characteristic comprises a slip of the synchronous machine.

14. The method of claim 13, further comprising:
responsive to determining the slip of the synchronous machine, increasing a margin of a pull-out torque.

15. The method of claim 12, further comprising:
specifying a margin of the pull-out torque with an upper and a lower bound to decrease a frequency of armature voltage changes.

16. The method of claim 12, further comprising:
determining a suitably smooth estimate of a mechanical load torque using a real power demand signal monitored at the armature of the synchronous machine;
determining an estimated pull-out torque of the machine using physical parameters of the synchronous machine, the real and reactive power monitored at the armature, and the applied armature voltage; and
comparing a difference in the estimate of the mechanical load torque and the estimated pull-out torque against a pre-defined margin boundary.

17. The method of claim 12, further comprising:
adjusting the armature voltage to be supplied to the machine to cause a pull-out torque of the machine is greater than a maximum mechanical torque demand.

18. The method of claim 12, wherein adjusting the armature voltage further comprises:
selecting a first tap of a regulating transformer supplying power from a power source.

19. The method of claim 18, further comprising:
selecting a second tap of the regulating transformer, the second tap configured to supply voltage at a different level than the first tap.

20. The method of claim 12, further comprising:
determining the characteristic based on a measurement of the machine actual mechanical load torque.

* * * * *